(12) United States Patent
Arai et al.

(10) Patent No.: US 7,134,518 B2
(45) Date of Patent: Nov. 14, 2006

(54) CONSTRUCTION MACHINE

(75) Inventors: Seigo Arai, Hiroshima (JP); Takashi Tsukiana, Hiroshima (JP); Koichi Yamashita, Hiroshima (JP); Kazuhiro Ueda, Hiroshima (JP); Hiroaki Iwamitsu, Hiroshima (JP)

(73) Assignee: Kobelco Construction Machinery Co., Ltd., Hiroshima (JP)

( * ) Notice: Subject to any disclaimer, the term of this patent is extended or adjusted under 35 U.S.C. 154(b) by 327 days.

(21) Appl. No.: 10/768,099

(22) Filed: Feb. 2, 2004

(65) Prior Publication Data

US 2004/0173395 A1 Sep. 9, 2004

(30) Foreign Application Priority Data

Mar. 7, 2003 (JP) .............................. 2003-061745

(51) Int. Cl.
*B60K 11/06* (2006.01)
(52) U.S. Cl. ................... 180/68.1; 180/68.2; 180/68.4
(58) Field of Classification Search .............. 180/68.1, 180/68.2, 68.3, 68.4
See application file for complete search history.

(56) References Cited

U.S. PATENT DOCUMENTS

| | | | | | |
|---|---|---|---|---|---|
| 3,788,418 | A | * | 1/1974 | Clancy et al. ............. | 180/68.4 |
| 5,791,301 | A | * | 8/1998 | Watanabe ................. | 123/41.31 |
| 5,816,351 | A | * | 10/1998 | Akira et al. .............. | 180/68.1 |
| 6,032,620 | A | * | 3/2000 | Tsukiana et al. .......... | 123/41.48 |
| 6,192,839 | B1 | * | 2/2001 | Takeshita et al. ......... | 123/41.49 |
| 6,223,845 | B1 | * | 5/2001 | Miyachi et al. ............ | 180/68.3 |
| 6,302,066 | B1 | * | 10/2001 | Steinmann ............... | 123/41.49 |
| 6,390,770 | B1 | * | 5/2002 | Takeshita .................... | 415/119 |
| 6,427,798 | B1 | * | 8/2002 | Imashige .................... | 180/309 |
| 6,540,036 | B1 | * | 4/2003 | Sugano ...................... | 180/68.1 |
| 6,601,324 | B1 | * | 8/2003 | Iwasa et al. ................. | 37/347 |
| 6,745,860 | B1 | * | 6/2004 | Yabe .......................... | 180/68.1 |
| 6,901,903 | B1 | * | 6/2005 | Nakajima et al. ........ | 123/198 E |
| 6,922,925 | B1 | * | 8/2005 | Watanabe et al. ............. | 37/466 |
| 2005/0211483 | A1 | * | 9/2005 | Pfhol et al. ................ | 180/68.1 |

FOREIGN PATENT DOCUMENTS

| | | | |
|---|---|---|---|
| JP | 8-277713 | * | 10/1996 |
| JP | 2000-130161 | | 5/2000 |
| JP | 2002-88818 | | 3/2002 |
| WO | WO 03/002364 | | 1/2003 |

OTHER PUBLICATIONS

Paten Abstracts of Japan, JP 2000-120106, Apr. 25, 2000.
Paten Abstracts of Japan, JP 08-277713, Oct. 22, 1996.

* cited by examiner

*Primary Examiner*—Jeff Restifo
(74) *Attorney, Agent, or Firm*—Oblon, Spivak, McClelland, Maier & Neustadt, P.C.

(57) ABSTRACT

In a construction machine comprising an engine, hydraulic device, and heat exchanger for cooling the engine and the hydraulic device, which are all disposed in an upper rotating body of the construction machine, there is formed a maintenance passage along which maintenance portions of the engine and the hydraulic device are disposed so as to cross the upper rotating body. Exhaust air from cooling fans for sending air to the heat exchanger is discharged to the exterior of the machine body through the passage. Thus, the passage is utilized as an exhaust air passage for the heat exchanger, whereby it is possible to provide a construction machine improved in cooling efficiency for the heat exchanger.

13 Claims, 2 Drawing Sheets

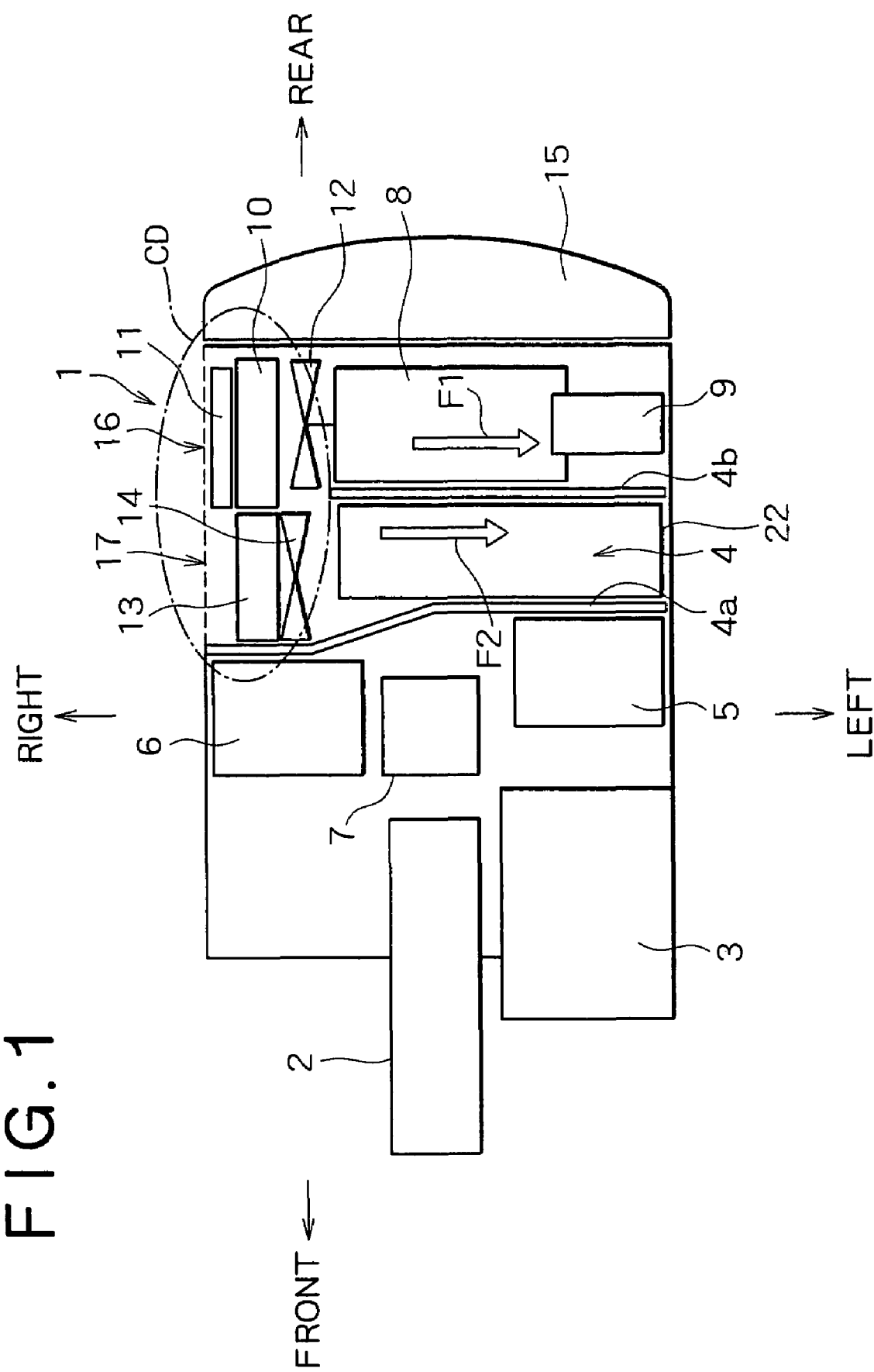

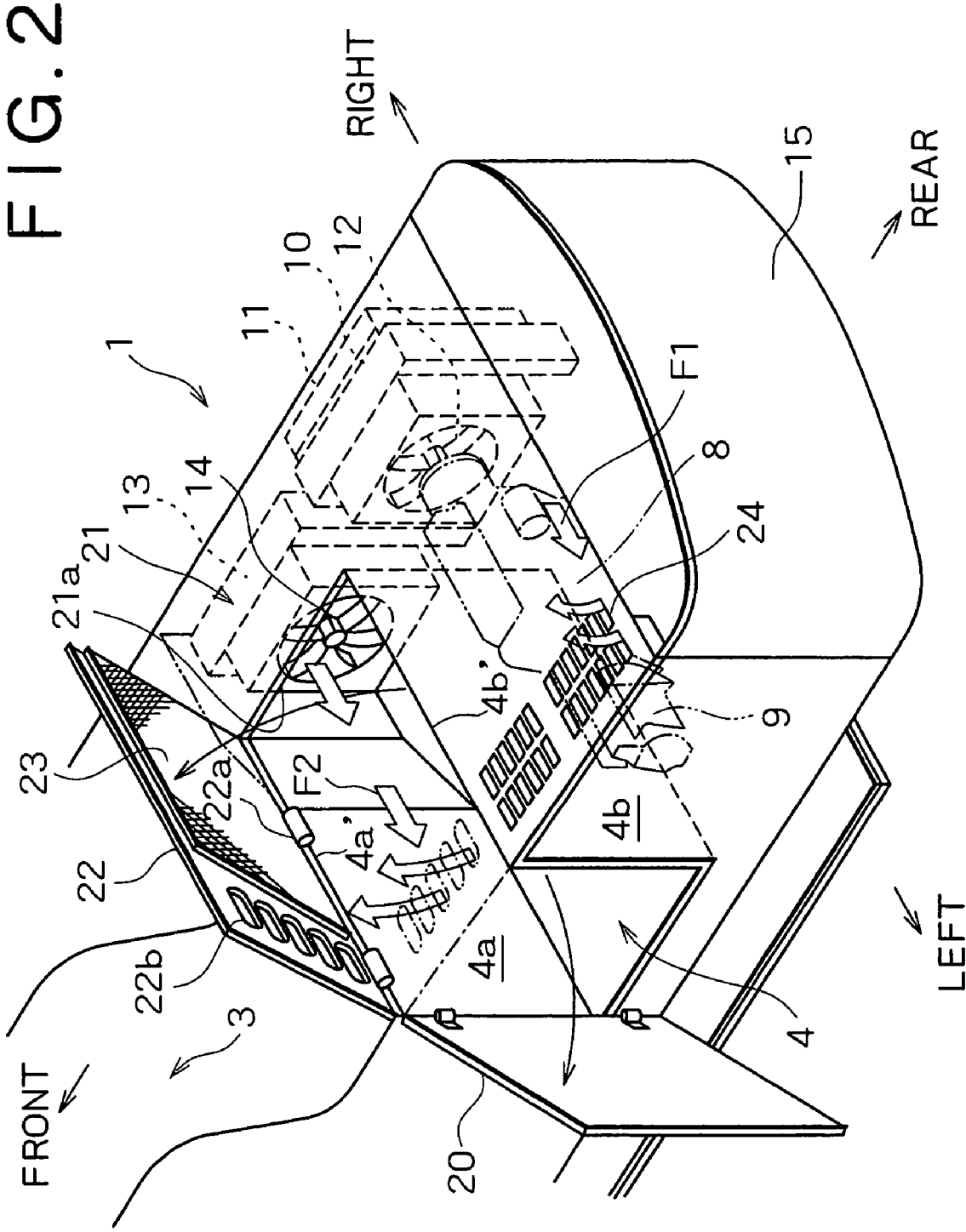

CONSTRUCTION MACHINE

BACKGROUND OF THE INVENTION

1. Field of the Invention

The present invention relates to a construction machine having a cooling device.

2. Description of the Related Art

A hydraulic excavator having a space for an inspection work to inspect an engine and hydraulic devices mounted on an upper rotating body is disclosed in Japanese Patent Laid Open Publication No. 2002-88818. The space is isolated from an engine room.

When an inspection door installed along the space is opened, there appear portions for maintenance such as engine oil filter and fuel filter.

On the other hand, for cooling devices, there are disposed heat exchanger such as radiator and inter-cooler within the engine room. However, there has been the problem that exhaust air from these devices is not smoothly discharged to the exterior of the machine body, but strikes against side walls in the interior of the engine room for example, giving rise to an exhaust air roll-up phenomenon. There also has been the problem that even if the capacity of a blower for sending air to those devices is increased, the cooling efficiency of heat exchangers does not become high in proportion thereto.

SUMMARY OF THE INVENTION

It is an object of the present invention to provide a construction machine having a maintenance passage in a machine body and also having a cooling device improved in cooling efficiency for heat exchanger.

The construction machine of the present invention has a basic construction comprising an upper rotating body mounted rotatably on a lower traveling body, as well as an engine, hydraulic device, and heat exchanger for cooling the engine and hydraulic device, which are disposed in the upper rotating body. The upper rotating body has a maintenance passage for an inspection work to inspect the engine and hydraulic device, with both intake port and exhaust port being formed in the maintenance passage. Further provided is a cooling device which is disposed face to face with the intake port to send air to the heat exchanger.

Since the construction machine is constructed such that exhaust air from a cooling fan for cooling the heat exchanger is discharged through the maintenance passage to the exterior of the machine body, the exhaust air from the cooling fan is discharged through the maintenance passage which has a large section, without being obstructed by a large obstacle such as the engine. Consequently, the exhaust air is uniformed and flows smoothly, whereby the cooling efficiency can be enhanced.

BRIEF DESCRIPTION OF THE DRAWINGS

FIG. 1 is a plan view showing schematically in what manner a cooling device is disposed in a construction machine according to an embodiment of the present invention; and FIG. 2 is a perspective view showing the construction of a maintenance passage in the embodiment.

DESCRIPTION OF THE PREFERRED EMBODIMENTS

A basic construction of the present invention resides in a construction machine comprising an engine, hydraulic device, heat exchanger for cooling the engine and hydraulic device, and a maintenance passage, which are disposed in an upper rotating body, the maintenance passage being formed so as to extend across the upper rotating body and with maintenance portions of the engine and hydraulic device being disposed along the maintenance passage, wherein an intake port and an exhaust port are formed in the maintenance passage, and a cooling fan as a cooling device for sending air to the heat exchanger is disposed so as to face the intake port, thereby allowing exhaust air from the cooling fan to be discharged to the exterior of a body of the machine through the maintenance passage.

The intake port acts as inlet of cooling air (outside air) introduced therefrom. The exhaust port acts as outlet of exhaust air (exhaust gas) conducted to the maintenance passage discharged therefrom.

By the term "cooling device" as referred to herein is meant to include a blower which sends not only cold air but also mere outside air.

A cooling device in a construction machine according to an embodiment of the present invention will be described hereinunder with reference to FIGS. 1 and 2, provided the invention is not limited thereto.

FIG. 1 is a plan view showing schematically a cooling device in a construction machine according to an embodiment of the present invention, in which the cooling device is applied to a hydraulic excavator.

In the illustrated hydraulic excavator, an upper rotating body 1 is mounted rotatably on a lower traveling body. A front attachment 2 as a working attachment is attached to a front end portion of the upper rotating body 1. On the left-hand side of the front attachment 2 is disposed a cabin 3 as an operator's seat.

A maintenance passage 4 (hereinafter may be referred to simply as "passage") is formed nearly centrally of the upper rotating body 1 so as to extend transversely across the upper rotating body 1. The passage 4 is partitioned by a front partition wall 4a and a rear partition wall 4b both disposed or erected substantially in parallel from a rotating frame (not shown) of the upper rotating body 1. The maintenance passage 4 is formed in the shape of a concave channel by the front and rear partition walls 4a, 4b and a bottom passage plate. As to a right end of the rear partition wall 4b, it is extended up to near a cooling device CD (disposed in the portion enclosed with a dot-dash line in FIG. 1). In other words, the right-end of the rear partition wall 4b breaks off near the cooling device CD. In FIG. 1, the passage 4 seems to be shown in a rectangular shape, but a closed line for showing the rectangular shape is a representation in terms of a contour line of an upper door 22 shown in FIG. 2 as described later. As shown in FIG. 2, the passage 4 itself is in communication with a space wherein a second cooling fan 14 is disposed.

A hydraulic oil tank 5 is disposed between the front partition wall 4a and the cabin 3. A fuel tank 6 is disposed near the front partition wall 4a on the side opposite to the hydraulic oil tank 5. Further, approximately intermediate between the hydraulic oil tank 5 and the fuel tank 6, there is disposed a control valve 7 for controlling hydraulic oil to be fed to and discharged from a swing motor and a traveling motor (neither shown).

On the other hand, an engine 8 is disposed transversely within an engine room which is positioned behind the rear partition wall 4b, and a hydraulic pump 9 is connected to an output shaft of the engine 8.

Further, a radiator 10 for cooling the engine 8 and an inter-cooler 11 for reducing the temperature of pressurized intake air are disposed in opposition to and in series with a first cooling fan (first cooling means) 12 which is driven by the engine 8. An oil cooler 13 for cooling the hydraulic oil is disposed side by side with the radiator 10. A second cooling fan (second cooling means) 14 for sending air to the oil cooler 13 is driven by a dedicated motor.

The radiator 10, inter-cooler 11 and oil cooler 13 function as heat exchanger. The numeral 15 denotes a counter weight attached to a rear end of the upper rotating body 1.

In the hydraulic excavator constructed as above, when the hydraulic pump 9 is actuated by the engine 8, the flow rate and direction of the hydraulic oil discharged from the hydraulic pump 9 are controlled by the control valve 7 and the hydraulic oil thus controlled is fed to hydraulic actuators for actuating the front attachment 2, etc.

During operation of the engine, the hydraulic oil which returns at a high temperature is reduced its temperature by heat-exchange with cooling air while passing through the oil cooler 13. Cooling water which has circulated through the engine 8 is reduced its temperature by the radiator 10, and the inter-cooler 11 acts to reduce the temperature of intake air which has become high during pressurization of an engine supercharger.

While the construction machine is in operation, cooling air (outside air) introduced from a first air intake port 16 which is formed in a side face of the machine body is heat-exchanged by the inter-cooler 11 and the radiator 10 in this order. After subsequently used for cooling the engine 8, the cooling air becomes an exhaust air F1 which has been raised in temperature, and the exhaust air is discharged from an exhaust port (to be described later) formed in an upper surface of the engine room.

On the other hand, cooling air (outside air) introduced from a second air intake port 17 formed sideways of the first air intake port 16 is heat-exchanged into exhaust air F2 by the oil cooler 13, which exhaust air F2 is conducted to the maintenance passage 4.

Thus, in this embodiment, the first cooling fan 12 for sending cooling air to the inter-cooler 11 and the radiator 10 and the second cooling fan 14 for sending cooling air to the oil cooler 13 are separately provided independently. According to the construction of this embodiment, the exhaust air from the first cooling fan 12 is allowed to pass along the engine 8, while the exhaust air from the second cooling fan 14 is allowed to pass through the maintenance passage 4.

Thus, it is important that the radiator 10 as a heat exchanger for cooling the engine 8 and the oil cooler 13 for cooling the hydraulic oil be arranged side by side, that the first cooling fan 12 for sending air to the radiator 10 and the second cooling fan 14 for sending air to the oil cooler 13 be arranged as cooling means, and that the exhaust air from either the first or the second cooling fan pass through the maintenance passage 4. As a result, the exhaust air path from the oil cooler 13 and that from the radiator 10 are separated from each other, so that the cooling efficiency can be improved.

FIG. 2 is a perspective view showing the construction of the maintenance passage 4 which functions as the exhaust air passage described above.

In the same figure, the same components as in FIG. 1 are identified by the same reference numerals as in FIG. 1, and explanations thereof will here be omitted.

In FIG. 2, the maintenance passage 4 is partitioned by the front partition wall 4a and the rear partition wall 4b as described above. The left end of the passage 4 is opened to form an open portion.

It is preferable that a lateral door or a side door 20 capable of being opened and closed or openable about a vertical shaft through hinges be provided in the open portion. In this case, the lateral door 20 can be kept closed except when maintenance work is to be performed. Numeral 21 denotes a top plate which closes the oil cooler 13 from above.

No partition is provided between the second cooling fan 14 and the maintenance passage 4, but the space between the two constitutes a communicating portion, which functions as an intake port. According to this construction, the exhaust air from the second cooling fan 14 is conducted directly into the passage 4.

The intake port 17 faces one end of the passage 4 extending transversely across the upper rotating body 1 and the exhaust port such as the exhaust slits 22b and the lateral door 20 faces the other end thereof.

The open portion of the maintenance passage 4 is formed in U shape by an upper edge portion 4a' of the front partition wall 4a, a left edge portion 21a of the top plate 21, and an upper edge portion 4b' of the rear partition wall 4b. It is preferable that an upper door 22 be provided in the open portion and that the door 22 be connected pivotally to the edge portion 4a' and 4b'. In this case, the open portion can be opened and closed by the upper door 22.

Preferably, the upper door 22 is mounted to the machine body so that it can be opened and closed or openable about a horizontal shaft through hinges 22a. In this case, the upper door 22 can be kept closed except when maintenance work is to be performed, whereby it is possible to suppress engine noise.

It is preferable that a large number of exhaust slits (exhaust ports) 22b be formed in the left end portion of the upper door 22, i.e., on a most-downstream side of the maintenance passage 4 in the flowing path of exhaust air F2. In this case, the exhaust air F2 flowing through the passage 4 is discharged upward on the left end side opposite to and remotest from the cooling air intake side of the oil cooler 13.

Thus, since the whole of the upper opening of the passage 4 is closed with the upper door 22 serving as a lid or a cover, it is possible to conduct and discharge the exhaust air at the position remotest from the heat exchanger. Besides, since the noise propagated from the engine room to the cabin 3 is reflected by not only the rear partition wall 4b but also the upper door 22 and attenuates, it is possible to attain the reduction noise.

Moreover, if the upper door 22 as a lid is installed openably, it is possible to enhance the cooling efficiency without sacrificing the maintainability. In the case of the passage 4 whose upper portion is open, noises such as engine noise and fan noise propagated from the engine room toward the cabin 3 are attenuated by only the rear partition wall 4b and are then released to the exterior. But in the present invention, a portion of propagated fan noise is reflected or attenuated directly or indirectly by the upper door 22 and is thereafter released to the exterior, so that it is possible to keep low the level of noise released to the exterior.

It is necessary that the noise discharged upward from the upper rotating body be prevented from affecting the interior of the cabin 3 insofar as possible. In this point, the present invention wherein the maintenance passage 4 is positioned between the cabin 3 and the engine room is advantageous because particularly the level of noise released upward on the side closer to the cabin 3 can be kept low. The front partition wall 4a of the passage 4 also contributes to attenuating a portion of the noise.

It is preferable that a noise insulating material 23 such as glass wool be affixed to an inner surface of the upper door 22. In this case, it is possible to prevent noise of the engine 8 from leaking to the exterior of the machine body through the maintenance passage 4. Further, the hinges 22a of the upper door 22 are provided in the upper edge portion of the front partition wall 4a, when the upper door 22 is opened, they stand up between the upper door and the cabin 3 and function as noise insulating plates, whereby it is possible to prevent direct propagation of the engine noise to the cabin 3.

If the noise insulating material is attached to the wall surface of any one of the front and rear partition walls 4a, 4b of the maintenance passage 4 and the upper door 22 as a lid, it becomes possible to decrease the noise level. If the heat insulating material is attached to all of the front and rear partition walls 4a, 4b and the upper door 22, the noise suppressing effect will be further improved. The noise insulating material may also be attached to the bottom of the maintenance passage for the purpose of reducing noise to a still greater extent.

The exhaust air from the first cooling fan 12 is discharged to the exterior of the machine body from an exhaust port 24 along an outer wall of the engine 8.

Although in this embodiment the exhaust air F2 is discharged from the exhaust ports 22b formed in an end portion of the upper door 22, the exhaust ports 22b may be substituted by exhaust ports formed in the lateral door 20. Or, the maintenance passage 4 may be constructed so that the exhaust air is discharged from both upper door 22 and lateral door 20, whereby the cooling efficiency is further improved.

The intake port 17 faces one end of the passage 4 extending transversely across the upper rotating body 1 and the exhaust port such as the exhaust slits 22b and the lateral door 20 faces the other end thereof.

It is preferable that the lateral door 20 be provided for opening and closing motion in an entrance/exit of the maintenance passage 4 which corresponds to a terminal end of an exhaust air duct. In this case, it becomes possible to close substantially the whole of the passage 4 and a portion of noise is attenuated also by the lateral door 20, so that it is possible to keep the noise level still lower. Affixing the noise insulating material also to an inner surface of the lateral door 20 is more effective for the suppression of noise.

It is also possible to divide the upper door 22 into two right and left doors so that the doors are openable or can be opened and closed each independently. For example, if one door positioned close to the oil cooler 13 is closed and the other door located away from the oil cooler is opened, the exhaust air can be discharged to the exterior of the machine body in a suppressed state of engine noise and without any compulsion. The number of doors to be divided from the upper door 22 is not limited to two, but may be three or more as necessary.

In the present invention, it is preferable that an upper opening portion of the maintenance passage 4 located close to heat exchangers such as the oil cooler 13 be closed with a lid to constitute an exhaust air duct. In this case, the exhaust air from the associated cooling fan is conducted smoothly into the passage 4. As a result, the so-called exhaust air roll-up phenomenon wherein the exhaust air is again introduced to the intake side of heat exchangers is eliminated and it is possible to further improve the cooling efficiency.

Although in this embodiment the radiator 10 for cooling the engine 8 and the oil cooler 13 for cooling the hydraulic oil are arranged side by side as heat exchangers and there are provided separate cooling fans for cooling the radiator and the oil cooler, this constitutes no limitation, but the first and second cooling fans may be constituted by a single cooling fan.

In this case, a portion of exhaust air passes through the engine 8 and the remaining exhaust air passes through the maintenance passage 4. Since the remaining exhaust air flowing through the passage 4 encounters no obstacle in its flow, it is possible to ensure a smooth exhaust air flow; besides, the exhaust air roll-up phenomenon is eliminated. Thus, even with a single cooling fan, the cooling efficiency is enhanced as is the case with the provision of two cooling fans.

It is preferable that the maintenance passage 4 be formed in front of or behind and in parallel with the engine 8 installed transversely. In this case, there accrues an advantage that the flow of exhaust air becomes smoother than in the case where the engine 8 is installed longitudinally with respect to the passage 4.

Although the invention has been described with reference to the preferred embodiments in the attached figures, it is noted that equivalents may be employed and substitutions made herein without departing from the scope of the invention as recited in the claims.

What is claimed is:

1. A construction machine comprising:
an upper rotating body mounted rotatably on a lower traveling body;
an engine and hydraulic device disposed in the upper rotating body;
heat exchanger disposed in the upper rotating body to cool said engine and said hydraulic device, said upper rotating body having a maintenance passage for maintenance of the engine and the hydraulic device, with an intake port and an exhaust port being formed in said maintenance passage, wherein said engine is not located in said maintenance passage; and
a cooling device disposed face to face with said intake port to send air to said heat exchanger,
wherein said cooling device, said heat exchanger, said engine and said maintenance passage are arranged such that at least a portion of the air sent to said heat exchanger by said cooling device is exhausted through said maintenance passage without passing said engine.

2. The construction machine according to claim 1, wherein said maintenance passage is formed by both a front partition wall and a rear partition wall disposed on a rotating frame of said upper rotating body.

3. The construction machine according to claim 2, further comprising:
a lid adapted to close an upper opening portion of said maintenance passage located near said heat exchanger, with an exhaust air duct being constituted by closing of said lid.

4. The construction machine according to claim 3, wherein said lid is supported openably.

5. The construction machine according to claim 2, further comprising:
a lid adapted to close the whole of an upper opening of said maintenance passage, with an exhaust air duct being constituted by closing of said lid.

6. The construction machine according to claim 5, wherein said lid is supported openably.

7. The construction machine according to claim 5, further comprising:
   a lateral door provided openably in an entrance/exit of said maintenance passage which corresponds to a terminal end of said exhaust air duct.

8. The construction machine according to claim 7, wherein said exhaust port is formed in either said lateral door or said lid.

9. The construction machine according to claim 3, further comprising:
   a noise insulating material attached to a surface of any one of said front partition wall for said maintenance passage, said rear partition wall for said maintenance passage, and said lid.

10. The construction machine according to claim 1, wherein said heat exchanger comprises a radiator for cooling said engine and an oil cooler for cooling hydraulic oil.

11. The construction machine according to claim 10, wherein said radiator and said oil cooler are arranged side by side, and said cooling device comprises a first cooling means for sending air to said radiator and a second cooling means for sending air to said oil cooler, and said cooling device is constructed in such a manner that exhaust air from either said first or said second cooling means passes through said maintenance passage.

12. The construction machine according to claim 1, wherein said engine is disposed in the width direction of said upper rotating body and said maintenance passage is formed in parallel with and in front of or behind said engine.

13. The construction machine according to claim 1, wherein said maintenance passage is formed so as to extend across said upper rotating body.

* * * * *